US006862017B2

(12) United States Patent
Chen (10) Patent No.: US 6,862,017 B2
(45) Date of Patent: Mar. 1, 2005

(54) WINDOW KEYBOARD

(76) Inventor: Richard Chen, 3F, No. 14, Alley 3, Lane 32, Sec. 7, Cheng Te Rd., Beitou Dist., Taipei (TW)

( * ) Notice: Subject to any disclaimer, the term of this patent is extended or adjusted under 35 U.S.C. 154(b) by 0 days.

(21) Appl. No.: 09/917,690

(22) Filed: Jul. 31, 2001

(65) Prior Publication Data

US 2002/0190955 A1 Dec. 19, 2002

(30) Foreign Application Priority Data

Jun. 15, 2001 (CN) .................................... 01227259 U (51) Int. Cl.[7] .............................. G09G 5/00; B41J 5/08
(52) U.S. Cl. ........................ 345/168; 345/172; 400/472
(58) Field of Search ................................ 345/168, 172; 341/22, 23, 28; 400/472, 486, 489

(56) References Cited

U.S. PATENT DOCUMENTS

| 4,698,618 | A | * | 10/1987 | Liuzzo et al. ............... 379/267 |
|---|---|---|---|---|
| 5,486,823 | A | * | 1/1996 | Tsai .............................. 341/22 |
| 5,600,313 | A | * | 2/1997 | Freedman ..................... 341/22 |
| 5,659,308 | A | * | 8/1997 | Goff ............................. 341/26 |
| 5,717,430 | A | * | 2/1998 | Copland et al. ............ 345/168 |
| 5,986,586 | A | * | 11/1999 | Tsai ............................. 341/22 |
| 6,011,495 | A | * | 1/2000 | Chen ........................... 341/22 |
| 6,320,519 | B1 | * | 11/2001 | Hsu et al. ..................... 341/23 |
| 6,431,776 | B1 | * | 8/2002 | Tzeng ......................... 400/472 |
| 6,445,381 | B1 | * | 9/2002 | Chou .......................... 345/168 |
| 6,460,103 | B1 | * | 10/2002 | Powers et al. .............. 710/305 |
| 6,529,145 | B1 | * | 3/2003 | Lin .............................. 341/22 |
| 2002/0154097 | A1 | * | 10/2002 | Chen .......................... 345/168 |

* cited by examiner

Primary Examiner—Xiao Wu
Assistant Examiner—M. Fatahiyar
(74) Attorney, Agent, or Firm—Rosenberg, Klein & Lee (57) ABSTRACT

A Window keyboard comprises a keyboard body having a single-chip microprocessor or ASIC therein and three function key blocks thereon. The three function key blocks include a File & Clipboard block, an Office block and an Application-setting block. Those blocks are electrically connected to the single-chip microprocessor and each has a plurality function key, wherein each function key generates a composite-key code for user to execute specific functions.

32 Claims, 9 Drawing Sheets

| Single function key | Composite key (corresponding to keys on keyboard) |
|---|---|
| CUT | ALT+E, T OR CTRL+X OR SHIFT+DEL |
| PASTE | ALT+E, P OR CTRL+V OR SHIFT+INSERT |
| COPY | ALT+E, C OR CTRL+C OR CTRL+INSERT |
| MARK | SHIFT MARK |
| UNDO | ALT+E, U OR ALT+BACKSPACE |
| REDO | ALT+E, R OR ALT+ENTER OR ALT+SHIFT+BACKSPACE |
| BOLD | CTRL+B OR CTRL+SHIFT+B |
| NEW | ALT+F, N OR CTRL+N |
| OPEN | ALT+F, O OR CTRL+O OR CTRL+F12 OR ALT+CTRL+F2 |
| SAVE | ALT+F, S OR CTRL+S OR SHIFT+F12 OR ALT+SHIFT+F2 |
| TASK PANE)–Office XP Only | ALT+E, K |
| FORWARD OR F D | CTRL+F |
| SEND | ALT+S OR CTRL+ENTER |
| SHORTCUT OR LAUNCH | CTRL+ALT+ SPECIFIC NON-SHIFT KEY |
| PRINT | ALT+F, P OR CTRL+P |
| CLOSE | ALT+F4 OR CTRL+W |
| LOGIN OUT | WIN, L |
| APPLICATION SWITCH | ALT+TAB OR ALT+SHIFT+TAB |
| MY COMPUTER | WIN+ E |
| REPLACE | ALT+E,E |
| REPLY | CTRL+R |
| BULLETS & NUMBER | ALT+O,N |

| single function key | Action of the function in Window system |
|---|---|
| Cut | Cut a marked text block or file |
| Paste | Paste a cut or copied text block or file |
| Copy | Duplicate marked text block or file |
| Mark | Choose text block or file |
| Redo | Redo a previous operation |
| Undo | Undo a previous operation |
| Bold | Switch between a bold or a normal format, and used to make the highlighted text to bold or normal format |
| Open | Open an existed file |
| New | New a blank file |
| Save | Save an edited file |
| Task pane | Show all items in a program list |
| FWD | Send a file to an address |
| Send | Send file to an addressee |
| Short cut or launch | Open chosen program such as WORD, EXCEL |
| Print | Print file |
| Close | Close the active window |
| Log off | Log off present user |
| Application switch | Switch among opened windows |
| My computer | Open programs of my computer |
| Reply | Replay mail to sender |
| Replace | Replace text or paragraph for a searched target |
| Bulletsh & num | Add bulletsh & num to head of paragraph |

FIG. 9

WINDOW KEYBOARD

FIELD OF THE INVENTION

The present invention relates to a Window keyboard, especially to a Window keyboard used in Window system for facilitate document-editing task without using composite keys and mouse.

BACKGROUND OF THE INVENTION

The computer hardware and software have rapid progress as the processing speed of computer is growing faster. However, the document-editing tool has insufficient development as compared with the progress of computer hardware and software.

In general, the document-editing task by computer is achieved by typing with keyboard and with the help of mouse. The typing and editing of document require frequent operation of the keyboard and mouse. It is easy for the typewriter to have industrial disease.

The ergonomic keyboards have been developed to overcome these problems. However, the prior art ergonomic keyboards still require the use of mouse. Moreover, some keyboard manufactures have developed multimedia keyboard, wherein a plurality hot keys are incorporated on the standard keyboard and specific driver is also developed for operating this keyboard in Windows environments. When user presses a specific hot key, a specific function is executed. However, the multimedia keyboard requires the help of mouse at most time and still has following problems:

1. The number of hot keys is limited by keyboard area and twenty hot keys are nearly a maximum.

2. A driver program is required, which occupies system resource and reduce operation speed. The installation of software and compatibility of software are also problems.

For example, the popular Microsoft Office software has provided tools including word, excel, power point etc. Those programs enable user to finish document like personal and commercial letters, spread sheet and presentation data. However, in editing above documents, the user needs to operate keyboard, mouse and frequently composite keys on keyboard to perform certain editing operation. It is still inconvenient for user.

SUMMARY OF THE INVENTION

It is an object of the present invention to provide a Window keyboard, which integrates a plurality of functional blocks thereon. More particularly, an office block, a file & clipboard block and an application setting block are arranged on a keyboard, and those blocks are connected to the I/O lines of a single-chip microprocessor. Therefore, the user can directly access those functional blocks without requiring specific driving program and the user does not need to remember composite keys or the help of mouse.

In one aspect of the invention, a plurality of functional blocks is integrated on a keyboard, whereby the user needs only one stroke to perform specific functions rather than pressing a plurality of composite keys or using mouse. The effort of keying operation can be minimized.

In another aspect of the invention, a plurality of functional blocks is provided with specific code table, which does not require any support of driver program. Therefore, the auxiliary device for editing document has not the problem of software compatibility. This is different to conventional hot key, which requires support of driver program.

In still another aspect of the invention, the present invention provides a code-conversion application software, which generate a pseudo composite-key code by a specific code table. Therefore, the driver program for keyboard does not need to update or revise.

The driver program for conventional hot key executes following operations. The keyboard generates E0 XX or usage code when the hot key is pressed. An associated program is invoked by using the WinExec 0 function provided by Window API and the path and filename of the program are also used as argument of the function. However, the detailed commands of the program cannot be exploited and the approach wastes considerable system resource.

The present invention provides a code-conversion application software hooking arbitrary usage code generated by the keyboard and setting an internal flag of Window OS. The code-conversion application software generates a key code according to the usage code generated by the keyboard and key code is sent to the Window OS for operating or invoking specific programs. The Window compatible programs, such as Window per se, Office, Works, Corel draw, Photo Impact etc., can be operated or invoked in this way. Therefore, the waste of system resource can be reduced.

Figure 1:
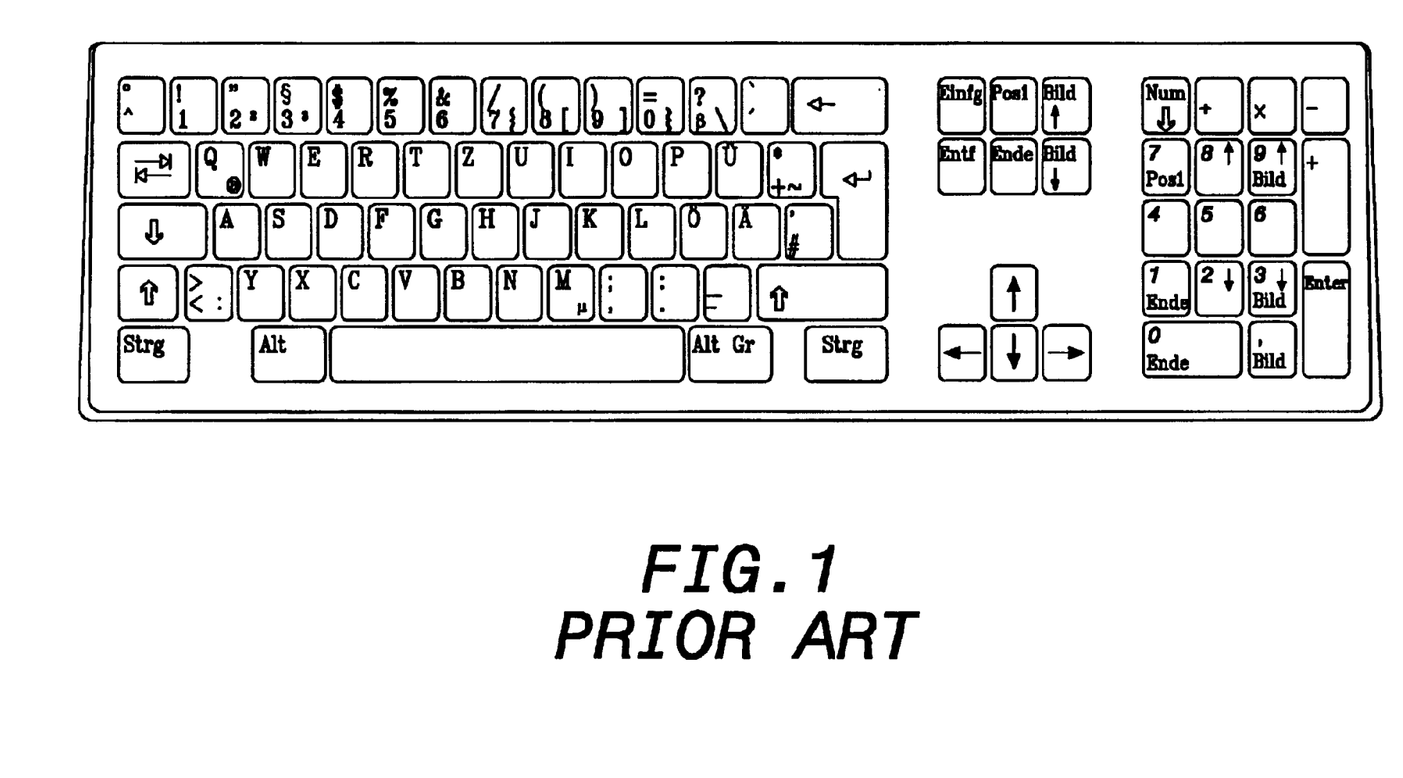
FIG. 1 shows the top view of a Germany keyboard.
Figure 2:
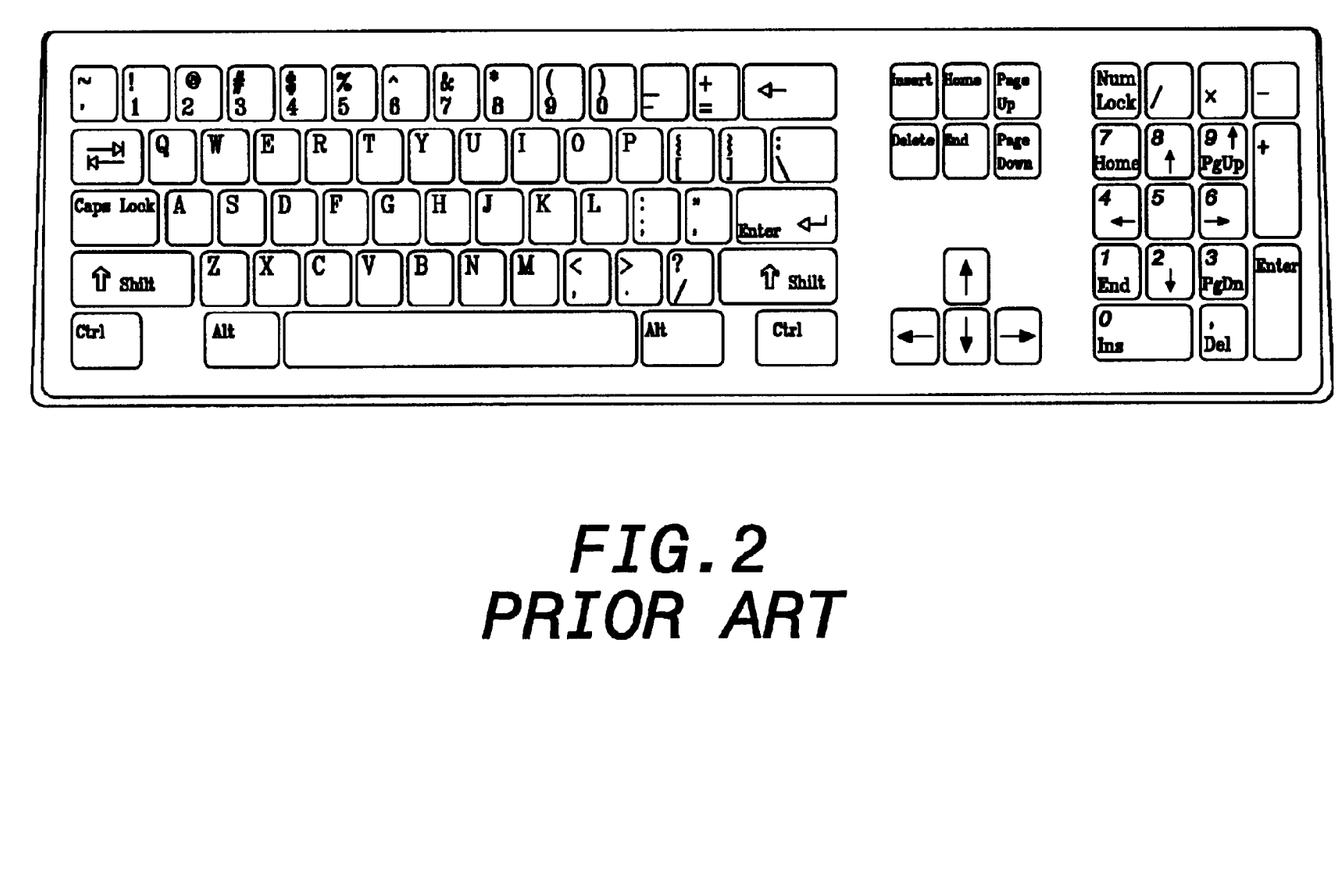
FIG. 2 shows the top view of an English keyboard.

The code-conversion application software of the present invention should be independent of keyboards for various countries. For example, the redo and undo operation can be executed by typing CTRL+Z and CTRL+Y, respectively. However, the alphabet arrangements on keyboard are different for different countries. In Germany keyboard, the positions of "Z" and "Y" are opposite to those of English keyboard. As shown in FIGS. 1 and 2, different functions will be executed for these two types of keyboards. Therefore, the composite keys cannot be arbitrarily assigned.

The various objects and advantages of the present invention will be more readily understood from the following detailed description when read in conjunction with the appended drawing, in which:

DESCRIPTION OF THE INVENTION

Figure 3:
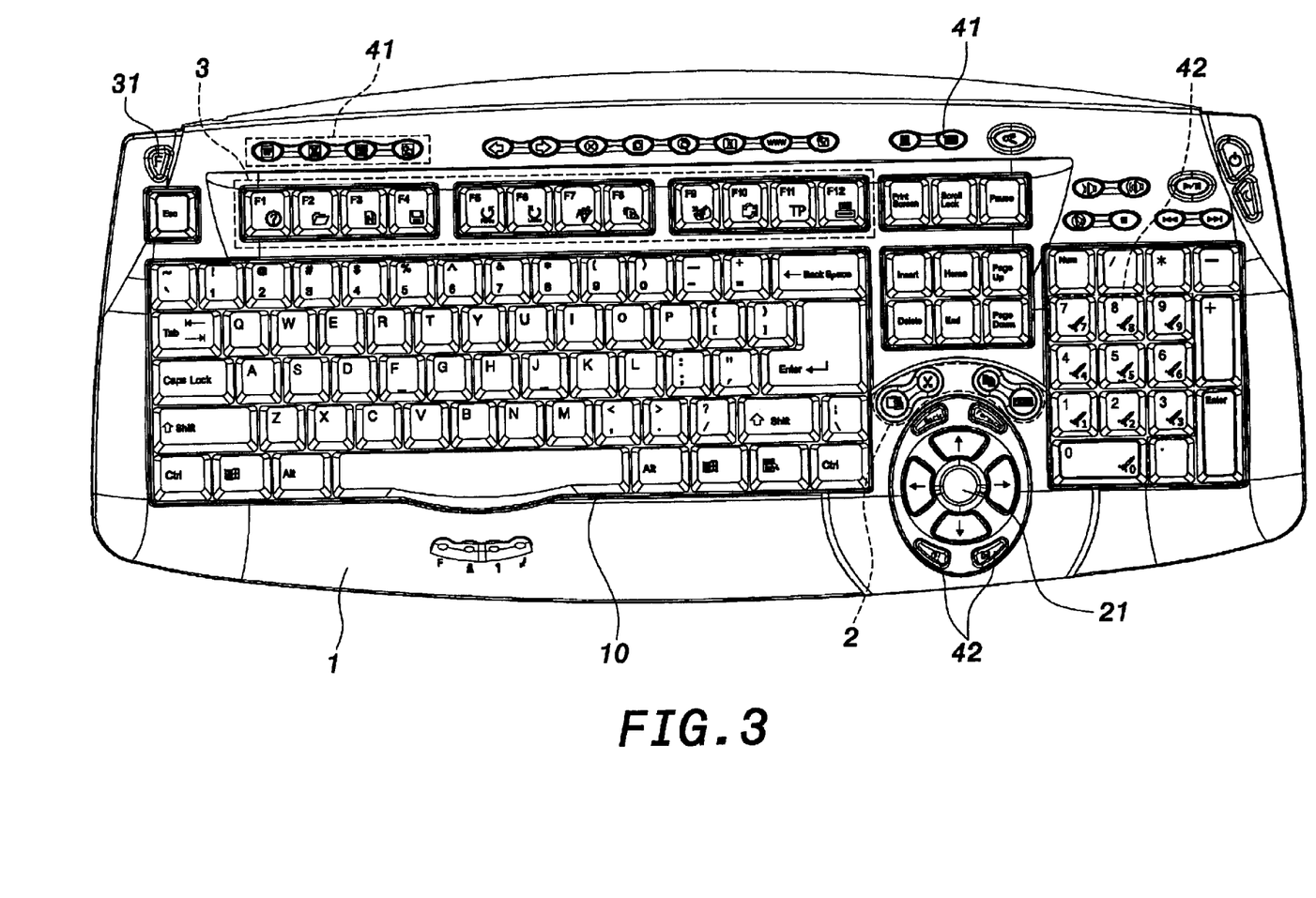
FIG. 3 shows the top view of the present invention.
Figure 4:
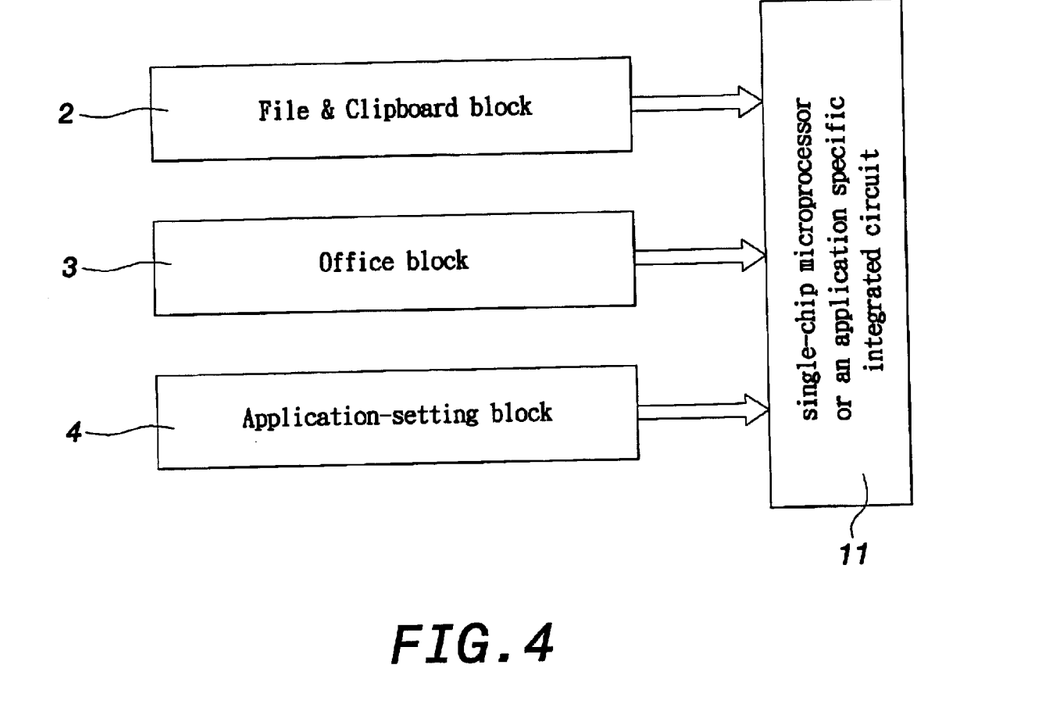
FIG. 4 shows the block diagram of the present invention.
Figure 5:
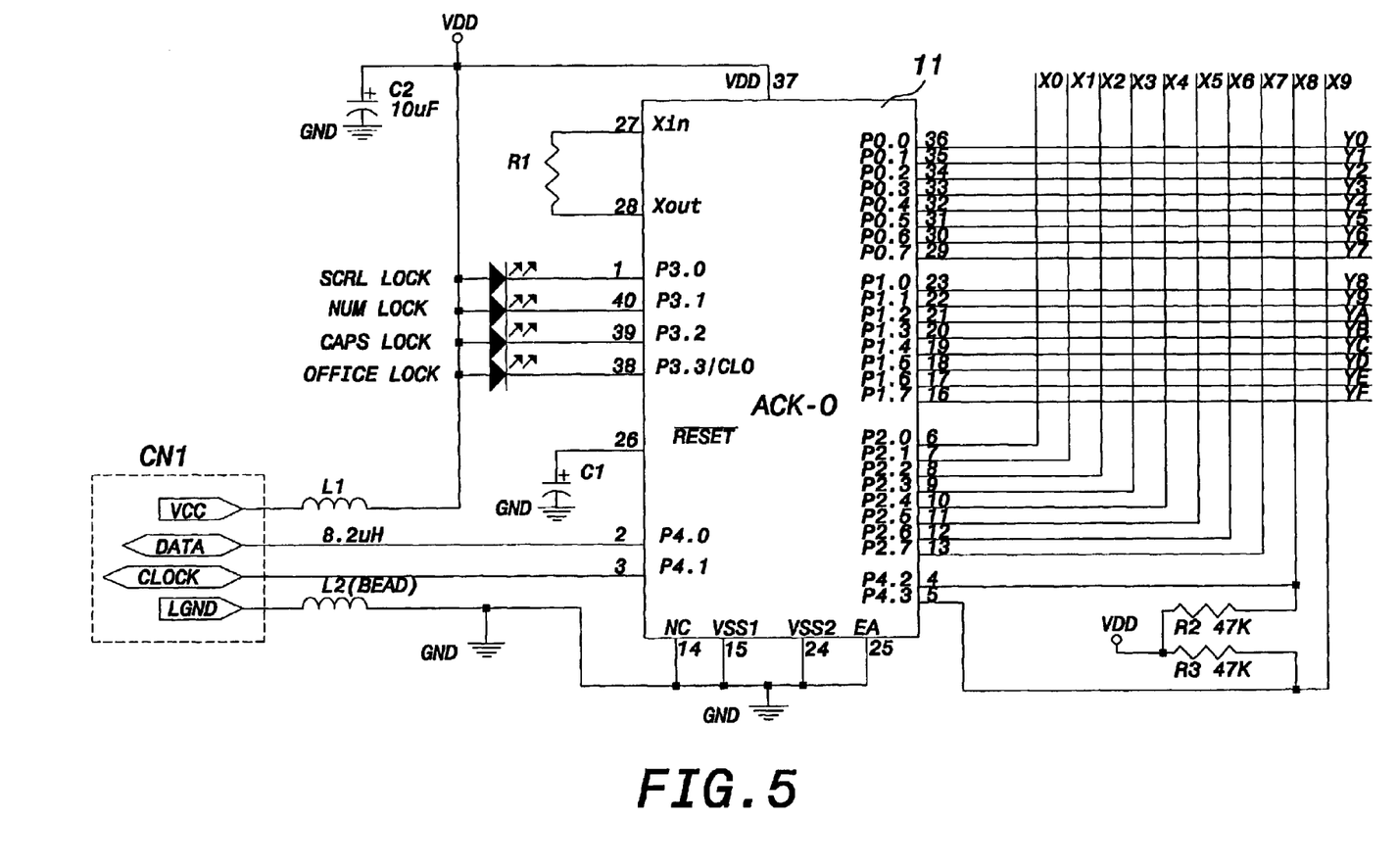
FIG. 5 shows the detailed circuit diagram of the present invention.

As shown in FIGS. 3 to 5, the present invention provides a Window keyboard comprises a keyboard body 1, a File & Clipboard block 2, an Office block 3 and an Application-setting block 4.

The keyboard body 1 contains a single-chip microprocessor 11 or an application specific integrated circuit (ASIC) therein. The File & Clipboard block 2 can be arranged at a position near the shift key, below the space bar or other margin place on the keyboard body 1 and electrically connected to the single-chip microprocessor 11. The File & Clipboard block 2 has function keys such as cut, paste, copy and mark. The mark key is used to mark a document segment to be edited. The cut key is used to cut the marked document segment. Then up arrow, down arrow, left arrow and right arrow on the keyboard are used to move cursor to a specific region on the screen. Afterward, the user can use the paste key or the copy key to paste or copy the selected document segment to the position of cursor. Moreover, the user can also use the mark key to mark a file for copying and moving the file.

Figure 7:
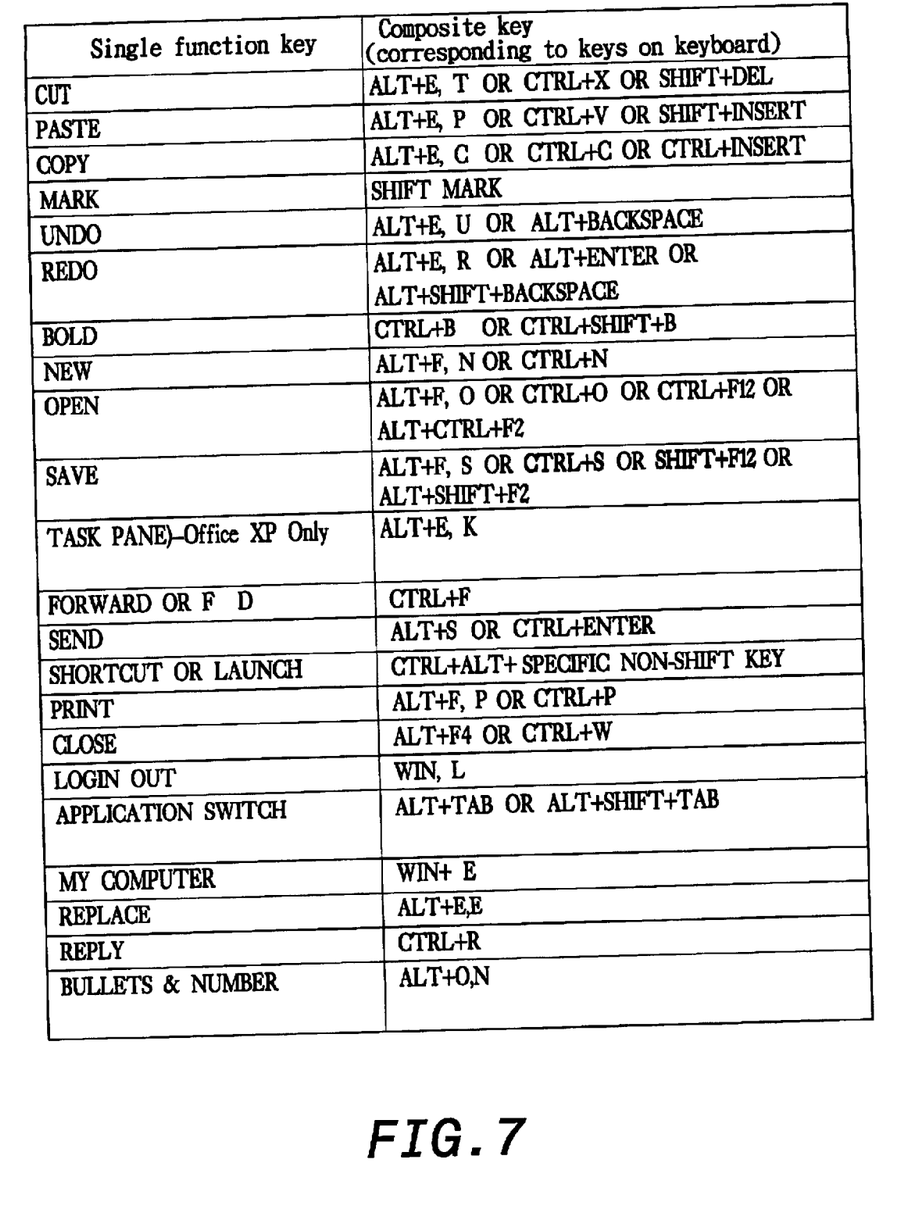
FIG. 7 shows the table of key code of the present invention.

When user presses any function key in the File & Clipboard block 2, the single-chip microprocessor 11 detects the keystroke of the key of the File & Clipboard block 2 and generates a pseudo composite-key code. FIG. 7 shows the relationship between the function keys in the File & Clipboard block 2 corresponding to the composite-keys. As can be seen from the figure, the composite keys corresponding to the cut key is ALT+E, T, CTRL+X or SHIFT+DEL, the composite keys corresponding to the paste key is CTRL+V (holding CTRL pressed and pressing V, then releasing both keys simultaneously), SHIFT+INSERT or ALT+E, P (holding ALT pressed and pressing E, then releasing both keys simultaneously, and then pressing P; therefore, "+" indicating pressing simultaneously and "," indicating releasing and then pressing), the composite keys corresponding to the copy key is ALT+E, C, CTRL+C, or CTRL+INSERT, and the composite keys corresponding to the mark key is SHIFT MARK.

Moreover, a screen-scrolling bar 21 is placed at the center of the up arrow, down arrow, left arrow and right arrow on the keyboard. The screen-scrolling bar 21 is used to scroll the screen in vertical or horizontal direction. When the screen-scrolling bar 21 is rolled, a key code is sent by the Window keyboard and the key code is interpreted by the single-chip microprocessor 11 to generate a corresponding pseudo composite-key code with the help of a code-conversion application software. This approach is different to the conventional keyboard wherein a scroll bar on the keyboard is operated to send code of mouse.

The different computer may have different processing speeds; therefore, the microprocessor 11 may generate the pseudo composite-key code with speed different to the generating speed of ordinary key (because the function key mimic the operation of releasing keys and then pressing key in conventional composite-key). In the preferred embodiment of the present invention, the separation between the issuing of pseudo composite-key code corresponding to the function keys in the File & Clipboard block 2 is at larger than 3 ms. Otherwise, few computer may have malfunction.

The Office block 3 is arranged on the special function keys F1–F12 or stand keys 10 on keyboard and is switched by a switch key 31. The switch key 31 is used to switch the function of the function keys F1–F12 between ordinary function and augmentation function of the Office block 3. The augmentation function including redo, undo, open, new, bold, save, take pane, forward, reply, send, bullets and number, replace, print, spell check etc. In other word, the microprocessor 11 has two different key code tables to switch the function of the function keys F1–F12 between ordinary function and augmentation function. The function of the function keys F1–F12 can be expanded while no new keys are necessary.

Figure 8:
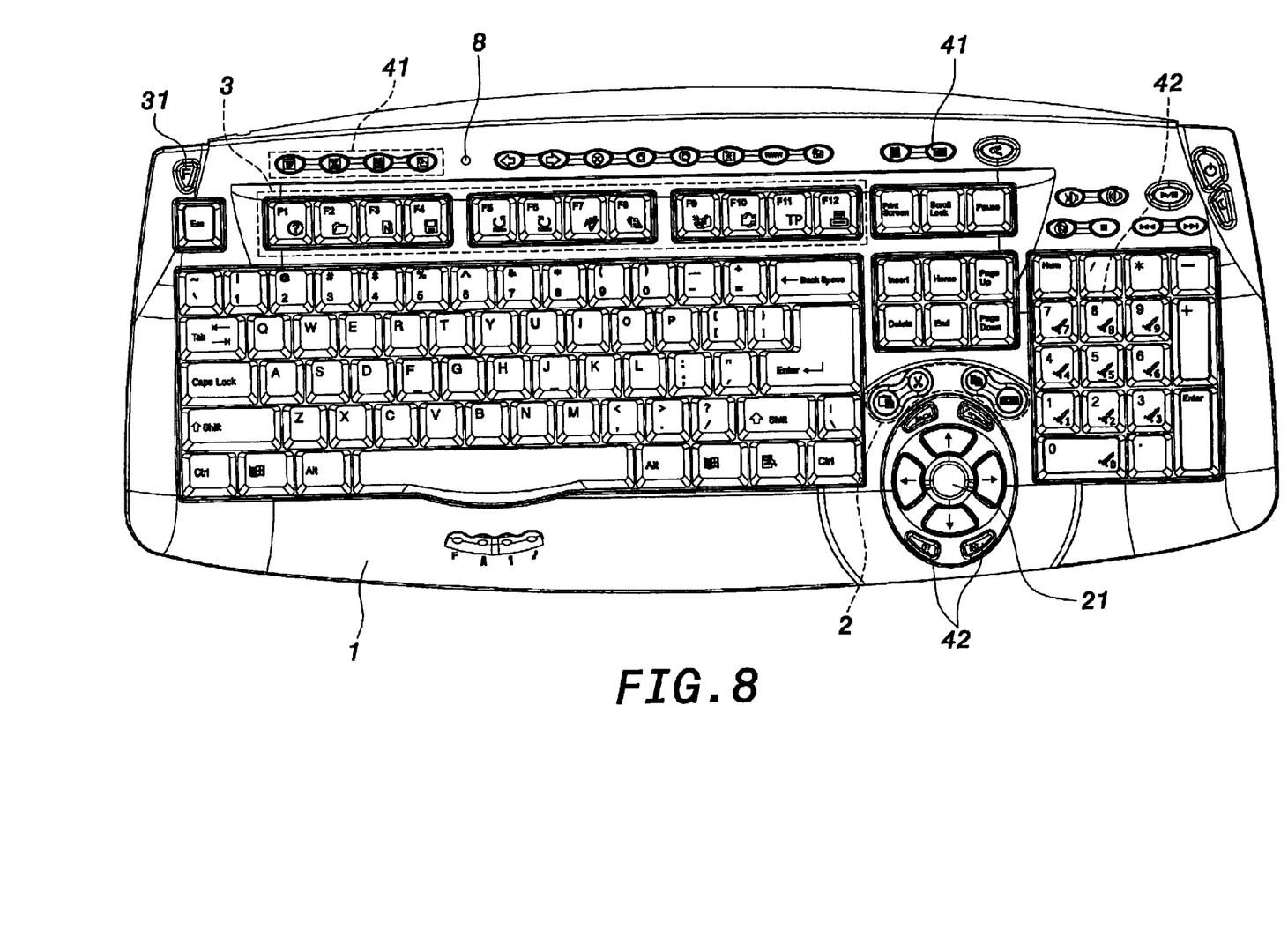
FIG. 8 shows the top view of another preferred embodiment of the present invention.

When the switch key 31 is pressed, the function keys F1–F12 have augmentation function as shown in FIG. 7. As can be seen from the table, the composite-key code for redo is ALT+E, R, ALT+ENTER or ALT+SHIFT+BACKSPACE; the composite-key code for undo is ALT+E, U or ALT+BACKSPACE; the composite-key code for open is ALT+F, O, CTRL+O, CTRL+F12, or ALT+CTRL+F2; the composite-key code for new is CTRL+N or ALT+E, N; the composite-key code for change to bold form or normal form is CTRL+B or CTRL+SHIFT+B; the composite-key code for save is CTRL+S, ALT+F, S, SHIFT+F12, or ALT+SHIFT+F2; the composite-key code for take pane is ALT+E, K; the composite-key code for forward is CTRL+F; the composite-key code for send is ALT+S or CTRL+ENTER; the composite-key code for reply is CTRL+R; the composite-key code for bullets and number is ALT+O, N; the composite-key code for replace is ALT+E, E; the composite-key code for print is ALT+F, P or CTRL+P. If the switch key 31 is pressed again, the function keys F1–F12 are switched back to ordinary functions. The state of the switch key 31 can be manifested by a light-emitting element, as shown in FIG. 8.

Alternatively, a key on the keyboard can be used as the switch key and the key code of the key is sent to the code-conversion application software to enable or disable the augmentation function of the function keys F1–F12.

The Office block 3 uses standard key code of Window system; no software compatibility problem is occurred.

The Application-setting block 4 is arranged at right side of the keyboard body 1 or at arbitrary location on the keyboard body 1. The Application-setting block 4 is electrically connected to the single-chip microprocessor 11 and comprises function key such as shortcut key 41 and application key 42. The default setting of the shortcut key 41 is Word, Excel, Power Point, Outlook, calculator and the shortcut key 41 is used to provided shortcut function in Window system for user. As shown in FIG. 7, the code corresponding to the short-cut key 41 is CRTL+ALT+ specific non-shift key.

When user presses the shortcut key 41, he can execute any programs without support of any driver program. For example, the user can open the content of a program on the desktop. In the short-cut section, the user presses the short-cut key 41 and select confirm to associate the program with the shortcut key 41. Afterward, the user can directly press the shortcut key 41 to launch the program. The shortcut key 41 can also be provided at the number pad of the keyboard body 1 and is switched by the Num or Scroll Lock key.

The Application-setting block 4 uses standard key code of Window system; no software compatibility problem is occurred.

The application key 42 comprises an application switch key, a close application key, and a log off key. The application switch key is used to toggle the opened application program to the active window of the screen. The user can press the close application key to close the application program on the active window of the screen. The close application key is used to log off current user. The composite-key code for application switch key is ALT+SHIFT+TAB or ALT+TAB; the composite-key code for close application key is ALT+F4 or CTRL+W; the composite-key code for log off key is WIN, L.

Figure 6:
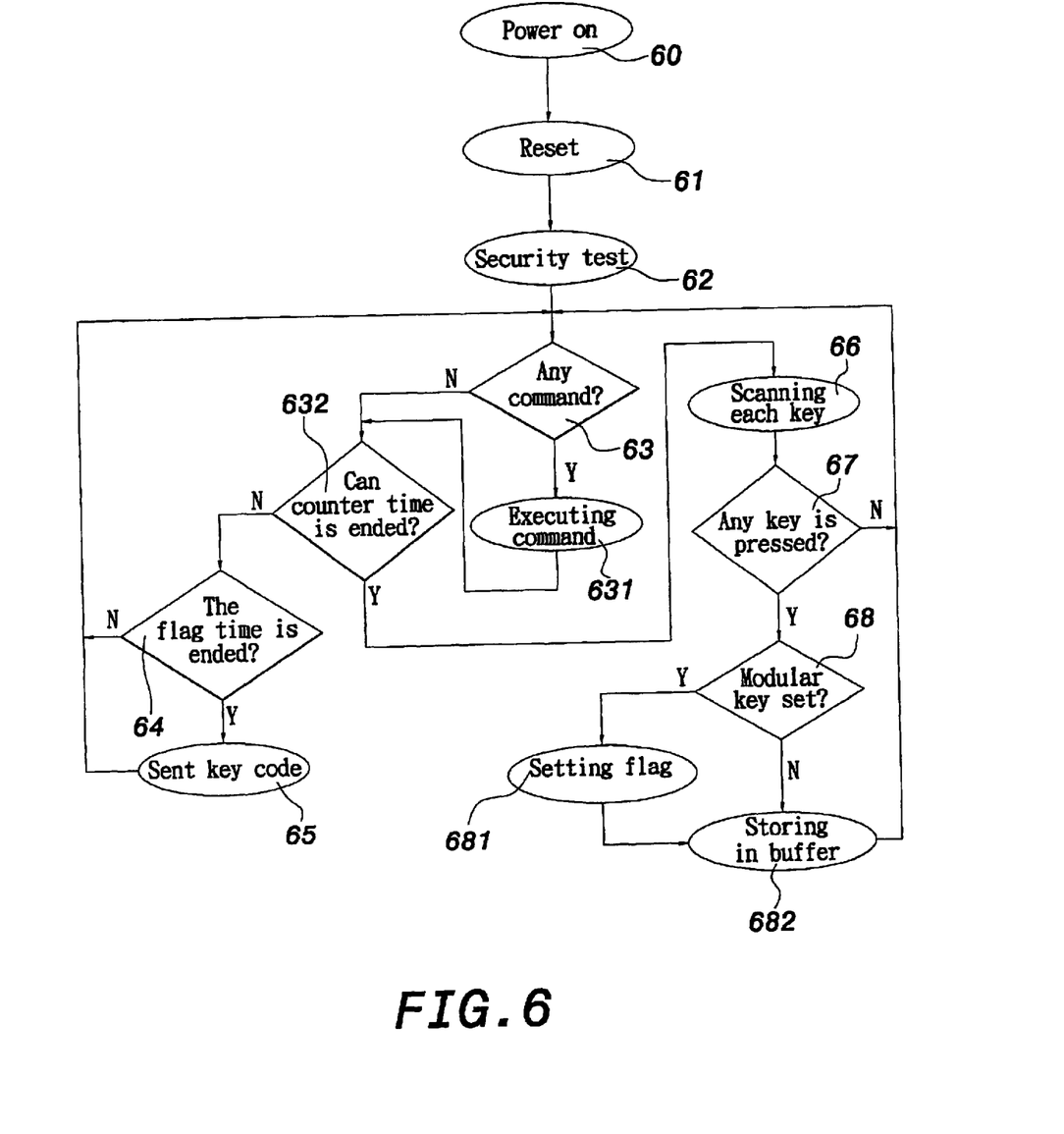
FIG. 6 shows the flowchart of operation of the single-chip microprocessor of the present invention.

FIG. 6 shows the flowchart of the microprocessor 11 in the preferred embodiment of the present invention.

After step 60 of powering on computer, the microprocessor 11 is first in reset state (step 61) and then begins security test (step 62). Afterward, if a command is sent to the microprocessor 11 in step 63, the microprocessor 11 executes the command in step 631 and in step 632 the microprocessor 11 judges whether the scan counter time is ended. If the scan counter time is not ended, the microprocessor 11 judges whether the flag time is ended in step 64. If the flag time is ended, the key code is sent in step 65, else the procedure is back to step 63.

If the scan counter time is ended, the microprocessor 11 scans each key in step 66 and judges whether a function key is pressed in step 67.

If no function key is pressed, the procedure is back to step 63, else the microprocessor 11 judges whether any function in the function blocks of the invention is pressed in step 68.

If no function key is pressed, the flag corresponding to this state is stored in buffer in step 682 and then the procedure is back to step 63. If certain function key is pressed, the flag corresponding to this state is set and stored in buffer in step 682.

To sum up, the Window keyboard of the present invention has following advantages:

(1) The user can directly use the modular key set to edit document without invoking conventional composite key or mouse.

(2) The modular key set can be operated stand-alone and does need the support of keyboard driver. Therefore, the modular key set does not have the problem of software compatibility.

(3) The user can use short-cut key to start any function associated with the short-cut key. It is very convenient.

(4) The area of the keyboard does not require enlargement. In the preferred embodiment of the invention, 36 function keys are augmented on the keyboard while the area of the keyboard is not increased.

Figure 9:
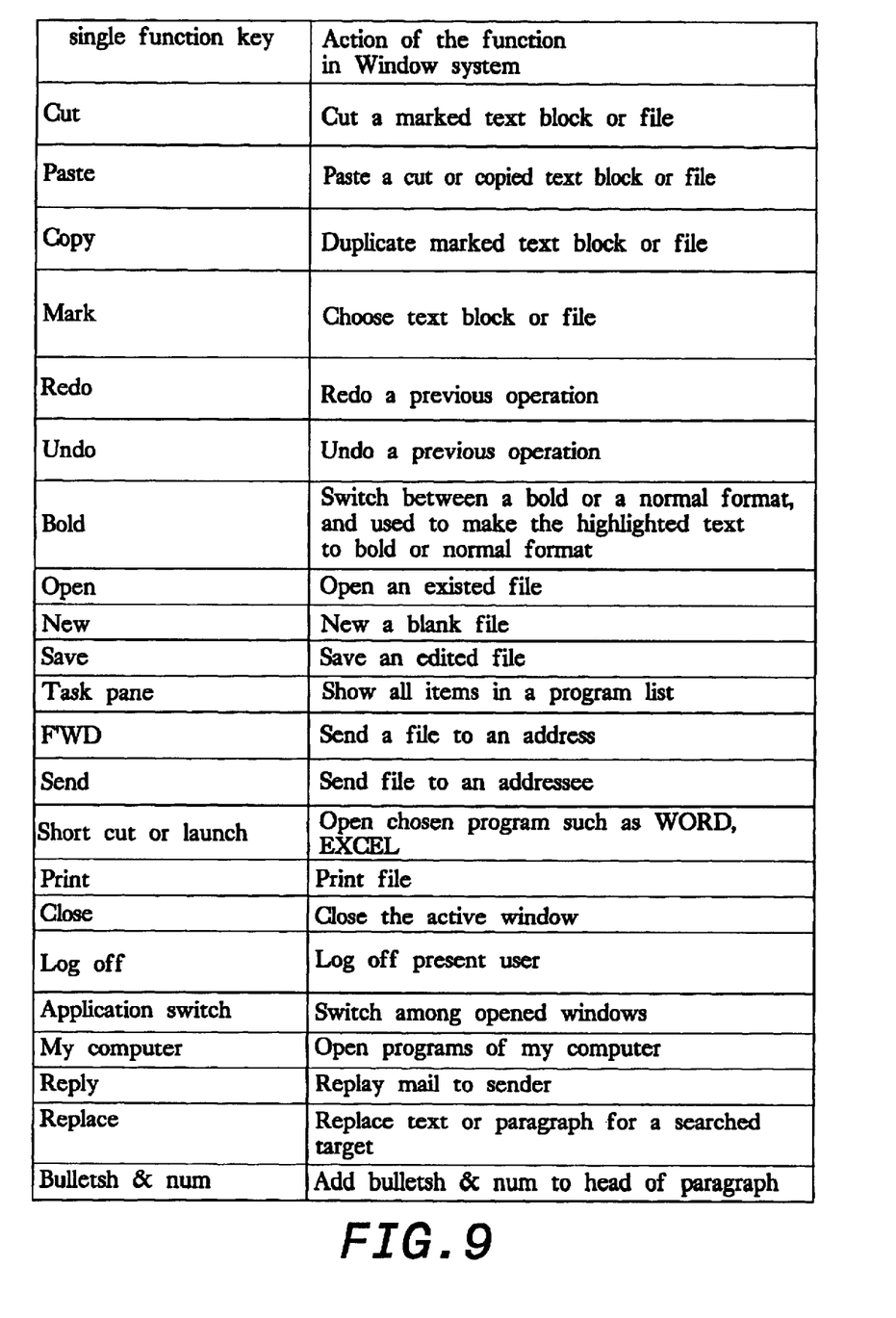
FIG. 9 shows the function description of the function key of the present invention.

(5) The function keys provided by the invention are more practical than the conventional hot keys. FIG. 9 lists the function description of the function keys of the present invention.

Although the present invention has been described with reference to the preferred embodiment thereof, it will be understood that the invention is not limited to the details thereof. Various substitutions and modifications have been suggested in the foregoing description, and other will occur to those of ordinary skill in the art. For example, as shown in FIG. 7, other function key can be assigned to the composite key including pressing and releasing of SHIFT, CTRL, ALT. Therefore, all such substitutions and modifications are intended to be embraced within the scope of the invention as defined in the appended claims.

I claim:

1. A Window keyboard comprising
a keyboard body having a control circuit therein, the control circuit being one of a single-chip microprocessor or an application specific integrated circuit, the keyboard body having three function key blocks thereon, the three function key blocks including a File & Clipboard block, an Office block and an Application-setting block, each of the function blocks being electrically connected to the control circuit and each having a plurality of function keys respectively corresponding to specific actions in a predetermined software environment; the control circuit generating a pseudo composite-key code responsive to each function key being operated, the pseudo composite-key code being formed by the group of codes consisting of codes representing simultaneous key switch operation, codes representing sequential key switch operation, and combinations thereof to execute the specific actions, wherein said Office block is a standard keyboard function block including standard function keys F1 through F12, Office related functions of said Office block being actuated through actuation of a key switch associated with said key switch operation.

2. The Window keyboard as in claim 1, wherein the function keys in the File & Clipboard block include a cut key, a paste key, a copy key, a mark key, and a screen-scrolling bar.

3. The Window keyboard as in claim 2, wherein the composite-key code for the cut key is one of ALT+E, T, CTRL+X or SHIFT+DEL.

4. The Window keyboard as in claim 2, wherein the composite-key code for the paste key is one of ALT+E, P, CTRL+V, or SHIFT+INSERT.

5. The Window keyboard as in claim 2, wherein the composite-key code for the copy key is one of ALT+E, C, CTRL+C, or CTRL+INSERT.

6. The Window keyboard as in claim 2, wherein the composite-key code for the mark key is SHIFT MARK.

7. The Window keyboard as in claim 1, wherein the Office block is switched by said key switch, and a light emitting element is used indicate switching status.

8. The Window keyboard as in claim 1, wherein the composite-key code for each function key is generated by a code-conversion application software.

9. The Window keyboard as in claim 8, wherein the function keys of the Office block is selected from a group consisting of redo, undo, open, new, bold, save, take pane, forward, reply, send, bullets and number, replace, print, spell check.

10. The Window keyboard as in claim 9, wherein the composite-key code for the redo key is one of ALT+E, R, ALT+ENTER or ALT+SHIFT+BACKSPACE.

11. The Window keyboard as in claim 9, wherein the composite-key code for the undo key is ALT+E, U or ALT+BACKSPACE.

12. The Window keyboard as in claim 9, wherein the composite-key code for the bold key is one of CTRL+B or CTRL+SHIFT+B.

13. The Window keyboard as in claim 9, wherein the composite-key code for the open key is one of ALT+F, O, CTRL+O, CTRL+F12, or ALT+CTRL+F2.

14. The Window keyboard as in claim 9, wherein the composite-key code for the new key is one of CTRL+N or ALT+E, N.

15. The Window keyboard as in claim 9, wherein the composite-key code for the save key is one of ALT+F, S, CTRL+S, SHIFT+F12, or ALT+SHIFT+F2.

16. The Window keyboard as in claim 9, wherein the composite-key code for the take pane key is ALT+E, K.

17. The Window keyboard as in claim 9, wherein the composite-key code for the forward key is CTRL+F.

18. The Window keyboard as in claim 9, wherein the composite-key code for the send key is one of ALT+S or CTRL+ENTER.

19. The Window keyboard as in claim 9, wherein the composite-key code for the reply key is CTRL+R.

20. The Window keyboard as in claim 9, wherein the composite-key code for the bullets and number key is ALT+O, N.

21. The Window keyboard as in claim 9, wherein the composite-key code for the replace key is ALT+E, E.

22. The Window keyboard as in claim 9, wherein the composite-key code for the print key is one of ALT+F, P or CTRL+P.

23. The Window keyboard as in claim 9, wherein the composite-key code for the spell check key is F7.

24. The Window keyboard as in claim 1, wherein the Application-setting block comprises shortcut key and application key.

25. The Window keyboard as in claim 24, wherein the shortcut key can be Word, Excel, Power Point, Outlook, calculator.

26. The Window keyboard as in claim 24, wherein the composite-key code for the shortcut key is CRTL+ALT+ a specific non-shift key.

27. The Window keyboard as in claim 24, wherein the application key comprises an application switch key, a close application key, and a log off key.

28. The Window keyboard as in claim 27, wherein the composite-key code for the application switch key is ALT+SHIFT+TAB or ALT+TAB.

29. The Window keyboard as in claim 27, wherein the composite-key code for the close application key is one of ALT+F4 or CTRL+W.

30. The Window keyboard as in claim 27, wherein the composite-key code for the log off key is WIN, L.

31. The Window keyboard as in claim 25, wherein additional shortcut key can be switched by one of the Num Lock key or Scroll Lock key.

32. The Window keyboard as in claim 1, wherein other function key can be assigned to the composite key including pressing and releasing of SHIFT, CTRL, ALT key.

* * * * *